(12) United States Patent
   Eleftheriadis (10) Patent No.: US 10,437,131 B2
(45) Date of Patent: Oct. 8, 2019

(54) LASER SCANNER BASED ON SWITCHING FILMS

(71) Applicant: Theofilos Eleftheriadis, Herzogenrath (DE)

(72) Inventor: Theofilos Eleftheriadis, Herzogenrath (DE)

( * ) Notice: Subject to any disclaimer, the term of this patent is extended or adjusted under 35 U.S.C. 154(b) by 0 days.

(21) Appl. No.: 15/907,054

(22) Filed: Feb. 27, 2018

(65) Prior Publication Data

US 2018/0329270 A1    Nov. 15, 2018

(30) Foreign Application Priority Data

May 12, 2017   (DE) .................. 10 2017 004 574

(51) Int. Cl.
   *G02F 1/31*     (2006.01)
   *G02F 1/29*     (2006.01)

(52) U.S. Cl.
   CPC ............... *G02F 1/31* (2013.01); *G02F 1/293* (2013.01); *G02F 2203/24* (2013.01); *G02F 2203/69* (2013.01)

(58) Field of Classification Search
   CPC ................................ G02F 1/31; G02F 1/293
   See application file for complete search history.

(56) References Cited

U.S. PATENT DOCUMENTS

| | | | |
|---|---|---|---|
| 6,647,167 B1* | 11/2003 | DeShazer | G02F 1/293 385/16 |
| 9,581,878 B2* | 2/2017 | Xie | G02F 1/31 |
| 2003/0198429 A1* | 10/2003 | Dho | G02B 6/262 385/18 |
| 2014/0246560 A1* | 9/2014 | Takahashi | G02B 21/002 250/201.3 |

FOREIGN PATENT DOCUMENTS

JP         2005234356 A  *  9/2005  ............. G02F 1/293

* cited by examiner

*Primary Examiner* — Charlie Y Peng (57) ABSTRACT

A laser scanner system that steers laser beams with GHz throughput and precision is based on switching (thin) films that are either metallic, or stacks of alternating dielectric films. The films are arranged with a slight tilt angle to the incident laser beam. They change their optical properties under electrical loads and become highly reflective to reflect the beam to a certain direction depending on the tilt angle of the switched film. In the area of laser based machining it will be possible to produce with a far higher throughput and precision than with conventional galvanometer based systems. The scanner can be also used in bar code scanners or in laser based TV systems. A new adaptive wavefront correction element can be achieved using switching films arranged in an xy matrix. Many applications of such a distortion correction element exist in adaptive optics.

14 Claims, 6 Drawing Sheets

LASER SCANNER BASED ON SWITCHING FILMS

CROSS REFERENCE

The present application claims benefit of priority of German Application No, 10 2017 004 574.7 for a application titled "Laserscanner basierend auf elektrisch schaltende Schichten" filed on the 12th of May 2017.

BACKGROUND OF DISCLOSURE

1. Field of Disclosure

The present disclosure relates to a new concept of deflecting—even high intensity—laser beams used for 1d, 2d and 3d laser scanning applications. The system can be used as a substitute for a 2d galvanometer scanner, that deflects a laser beam over a two dimensional area. Such a system has a broad range of use, that covers more or less every possible application of conventional galvanometer based laser scanners.

Systems that will benefit from the disclosure encompass 3D Laser scanners, 3D Printers, Rapid Prototyping Systems, Laser engraving systems, opthalmological laser systems, confocal microscopes. Laser printers, Laser shows, Laser systems for laser processing of ceramics and other materials—generally systems for planar (2d) laser processing. The system might also be used in barcode scanners, and various scanners for 2d area and 3d space measurement purposes.

2. Brief Description of the State of Knowledge in the Art

Current laser scanner systems are primarily based on galvanometer setups, that entertain two mirrors tilted towards each other, so that the superposition of the movement of the one with the movement of the other deflects a laser beam to an intended xy coordinate in a spatial angle, that is covered by the movement of the two mirrors. The galvo produces a torque, that makes the mirror tilt back and forth covering essentially a certain range of deflection angles, to which an incoming beam is deflected by reflection of the mirror. The basic deflection mechanism is based on mechanical movements of inertial masses. The disadvantages are obvious. Mechanical movements are not very fast compared to intended GHz jumps of the beam to new xy values, that can be freely chosen in the solid angle that is covered by the scanner. Mechanical systems also are inertial in their movement and their coverage of the deflection range. To change the direction of the movement a vibrating torsional system needs to pass by the reversal point, which obviously leads to delay times, peculiar movement patterns at the borders of the deflection range and dead times, that have to be taken into account in order to produce an adequate xy pattern. The movement of galvanometer mirrors is a ballistic movement, that determines the timing of the control loop of the galvosystem to produce the patterns that are intended. Inaccuracies in x and y have to be taken into account because of heat related changes in the mechanical setup. Even piezo based systems cannot cover the wanted range of deflection angles or the intended speed of operation.

A second class of systems is based on electrooptical materials that are longitudinally traversed to produce the wanted deflection. They suffer from problems related to the amount of energy/intensity that is absorbed by the used materials, which severely limits maximum power of the laser beam that can be deflected and the quality of the deflected laser beam. Even other systems, ones that are based on prisms or on acoustooptical materials, suffer from the same disadvantages.

OBJECTS AND SUMMARY

Accordingly a primary object of the present disclosure is to provide an improved mechanism to deflect a laser beam without using moving mechanical components and without using optical elements that hamper usability for high intensity laser beams due to their high optical depth. A further objective is an increase of the patterning speed and complete freedom to jump with the beam from one xy deflection direction to a totally different xy direction from one time step to the next.

Central to the disclosure is the use of elements that due to their optical switching characteristics can be either made highly transparent or highly reflective. These are used to deflect the laser beam and replace the function of the galvanometer mirrors used in galvo scanners. A means has to be to employed to arrange such elements on the path of the laser beam and to orient them in a tilted fashion with a fixed, precisely defined tilting angle going from one element to the next, to deflect the beam in discrete angular steps, so that the discrete tilt angles (or steps) of a deflected beam coming out of a first cascade of optical switching films/layers accurately cover the wanted total deflection range that is used by subsequent cascades that cover an ever smaller element to element tilt and therefore a smaller deflection range and therefore add smaller further tilts and finer granularity to the discrete angle steps.

The cascade might be called "deflection element". By switching "on" one element and switching "off" all the others in a "deflection element" a predetermined deflection is chosen that the incoming laser beam is made subject to. A beam can for example be deflected to an angle 0,w1, 2*w1,3*w1 and so on, up to an angle (n−1)*w1 for the last element in a "deflection element" that includes n switching films. These essentially are planar comparable to the galvo mirror—but might also be nonplanar, depending on the selection of the switching film/mirror mechanism. Using two or three such "deflection elements" in a cascade makes it possible to deflect the laser beam in ever smaller further deflection steps. It is important to note that the entity "deflection element" may differ in various ways from one deflection angle to the next. These "deflection elements" in a cascade might even not be two or three distinct mechanical compartments. The sole purpose of these "deflection elements" is to describe the way the laser beam is deflected to ever finer discrete deflection angles by cascading setups of sequences of switching films with fixed tilt from one switching film to the next in the sequence.

For example the use of a "deflection element" that covers an angle w of deflection angles having 12 switching films and the subsequent use of a deflection element that covers the angle w/12, with the same number of switching elements and the use of a last "deflection element" with a covered range of angle of w/(12*12), that again includes 12 switching elements makes it possible to hit 12*12*1.2=1728 discrete deflection angles in the angle coverage of w.

It is obvious that the switching films have to be perfectly aligned in their tilting angles, so that even in the case of the smallest tilt angles of the last deflection elements the whole deflection angle range is covered without gaps, without overlapping and equidistantly from one deflection angle step to the next. These constructive constraints are a prerequisite for a high spatial fidelity xy deflection of the laser beam. Due to high metrological precision that is possible in MEMS systems the necessary technology exists to make such a setup possible.

A possible embodiment of the optical switching elements might be based on metallic switching films. An other embodiment might be based on possibly stacked (possibly amorphous) dielectric films, with minor mismatches in the dielectric constants of one sequence of films in the stack compared to the other—a complementary sequence of films. In both cases it is necessary to maintain high planarity of the films, low overall surface roughness better than $\lambda/10$, high damage threshold of the films (for Lasers with kW output power). Sputtering or CVD processes are state of the art means to produce films of the wanted quality. A further aspect is the possibly huge area of the planar thin film, that is necessarily going to be implemented.

Metallic switching films are known to switch from transparrent to metallic in fractions of a ns (see reference [2000] Stefanovich et al.). The tests that are covered in the reference are based on the usage of a MOM Sandwich. The film, that might actually be used in a likely embodiment would preferably be very thin. For a full reflection a $VO_2$ film of 14 nm thickness actually is enough. Such a material in its transparent state would not absorb intensity due to the very small optical depth (Beer Lambert law, very small thickness of the medium). If a MOM sandwich is going to be used for the switching mechanism, the metallic film must be transparent, again as thin as possible, especially at the areas where the laser beam shines through. Possible setups include vertical sandwiches and horizontal sandwiches, and electrode layers that omit the path of the laser beam. For electrochromic switching even of bigger areas the possible switching setup has been proven viable.

The article of Stefanovich proves switching times of 1 ns for a switching voltage of 8V The profound meaning of that information is, that it is possible to scan a field of 4096 times 4096 scanning points with a "frame rate" of 60 Hz. A whole new world of generative laser processes becomes possible. Laser TV with very high frame rates becomes possible, for example 4K Laser TV with a frame rate of 120 Hz can be produced (1 GHz switching frequency of the optical switches).

Materials for dielelectric switching films would include chalcogenide films, that have been proven to switch in the ns range (see reference [2013] Myoung-Jae Lee et al.). There is a broad class of chalcogenide materials that can be used to procure a material for the purpose of fastly switching the optical properties to control a slight mismatch of dielectric properties for two complementary films for highly reflective dielectric stacks or multilayer structures. Filters with a reflectivity of 99.999% are possible—and this not only for one preferential wavelength, as in a case of a laser beam with fixed wave length. Such mirrors might also be used for adaptive optics for astronomical instruments. The switching times of ins are way beyond state of the art adaptive optics systems.

Other more speculative embodiments might include phase changes in a fluid medium, that rapidly build up a highly reflective membrane on being electrically switched with selectable electrode lines, making it possible to choose the tilt angle with firing up a selection of possible electrodes, that are all located in the same medium, hereby drastically removing a huge number of switching films that potentially have to be traversed. Again, the rapid buildup of the reflective area is the key to the solution of the problem.

The embodiment of the complete scanner would include cascades of "deflection elements". Actually there would be a cascade of three "deflection elements" for x followed by a cascade of three "deflection elements" for y—for the orthogonal tilt. A last deflection element might be used to balance the mismatch of traversed optical depths. The exiting laser beam, that has been trimmed to the same intensity for every combination of x and y may pass a last element to correct the wavefront distortion.

Further to achieve this, it might be necessary to widen the solid angle that the deflected beam is covering with a setup of lenses, after it left the scanner. Hereby it might be possible to handle only a small solid angle with the new scanner setup that afterwards is properly widened.

The so called "deflection elements" might have a film for shuttering purposes in front of the sequence of the switching films. In case of using ultra short pulses, laser synchronization might be the way to go to screen off the transient time period switching from one xy to the next. For cw Lasers the use of shutter films might do the trick of screening off the period between two switching states, but due to the high intensities it might be necessary to ward off the beam to a heat sink by proper total reflection.

A huge adaptive optics system, a planar CCD like dielectric mirror setup might be used to deflect the beam a last time to correct the wavefront distortion and to make the beam usable for focusing applications. The beam might have crossed $2*n*6$ thin films ($2*n$ for every "deflection element"). The distortion might be substantial (and might be measured with a Shack Hartmann wavefront sensor for example).

A means or method has to be put in place to sense the distortion for every combination of x and y in the deflection range, to have precomputed adaptive setups to cover all possible cases of deflection directions, of which every single one has its unique distortion characteristics. Under normal operation conditions those measurements would be fed into the correction element synchronously with the deflection angle xy that have been employed, to ensure a high quality beam for every deflection angle that can be attended to with the scanner system.

As a matter of fact the bandwidth and the covered area of state of the art adaptive optics is a problem. The systems in use today are limited by a bandwidth of 10 kHz.

A possible solution would include the use of the same switching film mechanisms that are employed to build up the scanner—with one significant distinction. This time the reflective film would be an xy resolved matrix that can be switched on and off by two applied voltages at precisely one point. Having a number m of such films—one stacked on the other—it would be possible to selectively set the optical path, that has to be traversed on a "per pixel" basis, again with speeds in the GHz range. The "stacks" might be built with metallic or dielectric xy matrices. Switching films would be combined with spacer/transparent pieces of fixed length (again in cascaded setups with ever shorter spacer lengths), to tackle the discrepancy of range of lengths that has to be covered on the one side with a finely grained discreteness of steps of optical depth that can be additively achieved on the other.

Similarly it would be possible to produce films with a fixed deflection angle, arranged as a xy resolved matrix, that can be switched by two applied voltages at precisely one point. By using a number m of such films, it would be possible to selectively set the deflection angle for the beam on a "per pixel basis", thereby making it possible to recover the wavefront to the directional signature of the undistorted beam. There might be configurations of adjacent switched pixels in the xy matrices of switching films, that would hinder the reflected beam from a pixel to leave the wavefront correction element due to a masking of a protruding adjacent pixel of a "higher" xy matrix. Therefore it might be necessary to put effort into the choice of possible deflection angles of the switching films. The choice would be in favor of smaller deflections and of deflection angles, that minimize the number of different maskings that have to be taken care of. As a possible solution to the masking configurations it would be possible to work out pixels that have various active fields, that can be individually switched on and off, thereby, switching off a masking area, either on the reflecting pixel or on the protruding pixel that is hit by the reflected beam from a pixel, that lies in a deeper stack. This would be a guarantee that the incoming intensity is totally reflected and not absorbed from bouncing multiple reflections in the stack of switching xy matrices.

It might be necessary to use a row/cascade of two or three said such stacks for phase correction and a row/cascade of two, or three said such stacks for deflection angle correction, with only a fraction of possible deflection range, but higher angular resolution or depth resolution for each subsequent stack in a row/cascade. Hereby it would be possible to finely deflect individual parts of the wavefront and finely correct the phase and angle of deflection of the wavefront on a "per pixel basis".

The whole adaptive wavefront correction solution would be quite similar to cascading "deflection elements" to produce the scanner. It would be a quantum leap in adaptive optics technology (GHz adaptive speed/frequency) making obsolete the state of the art systems (for example deformable mirrors, MEMS systems) that are in use today, with a broad scope of uses in astronomy, 3D imaging, vision, and biomedical applications.

BRIEF DESCRIPTION OF THE OBJECTS

In order to more fully understand the objects, the following detailed description of the illustrative embodiments should be read in conjunction with the accompanying drawings, wherein.

DETAILED DESCRIPTION OF THE ILLUSTRATIVE EMBODIMENTS

Figure 1:
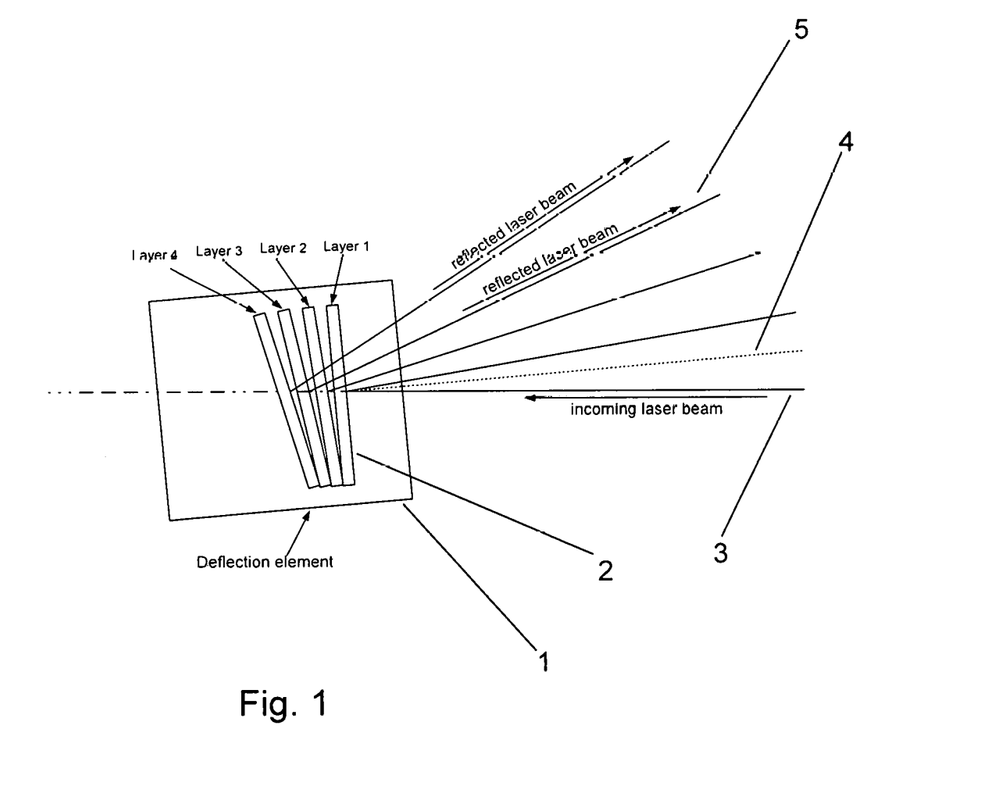
FIG. 1 depicts a deflection element, that consists of a sequence of tilted switching layers (electrochromic, or dichroitic dielectrically switching or other, preferably electrically switching layers, element No. 2). Element No. 1 is such a stack of tilted layers, that comprises a deflection element. Pos. 3 depicts an incoming beam, Pos. 4 the axis of incidence and Pos. 5 the reflected beam.
Figure 2:
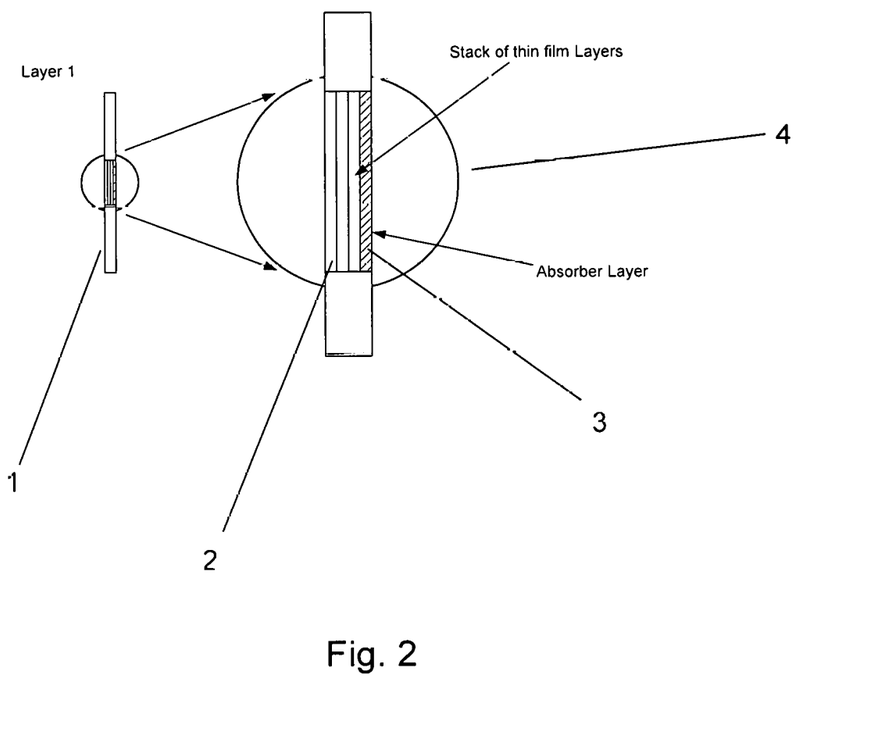
FIG. 2 depicts a possible stacked sequence of layers, that comprise the switching layer. Pos. 1 shows the switching layer in its completeness. Pos. 2 shows a sublayer of the switching layer, that might follow an ARAB stacking sequence, with material A being made of dielectric material 1, and B being made of dielectric material 2. The layer Pos. 3 might be an absorber layer. Pos. 4 depicts a magnified view of the switching layer Pos. 1
Figure 3:
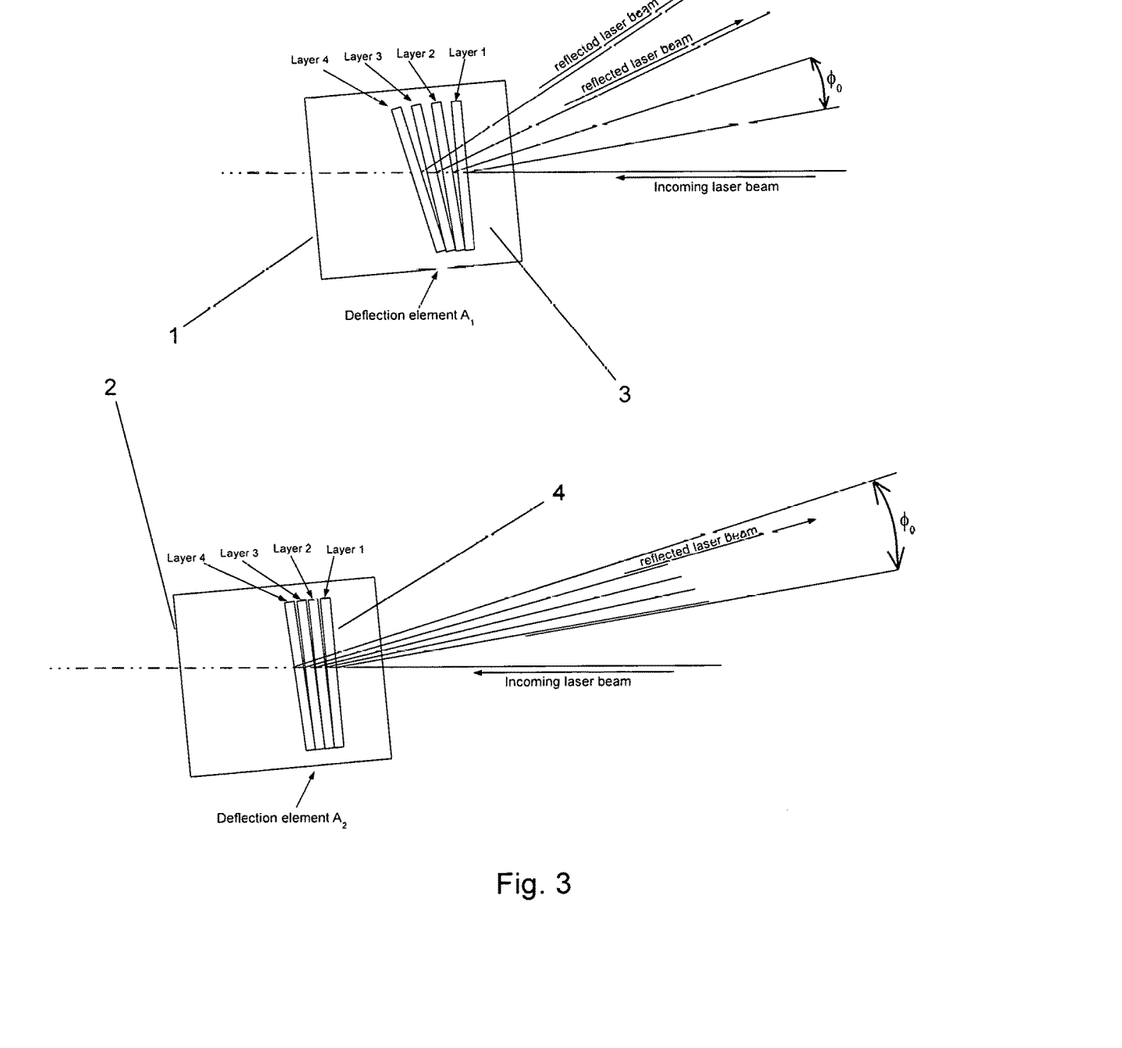
FIG. 3 shows the sequence of the span of the deflection angle of consecutive "deflection elements" for a possible cascaded embodiment of the deflecting elements. In Pos. 1 a "deflection element" with bigger deflection angle span is shown. In Pos, 2 a "deflection element" with a correspondingly smaller span is shown, where the deflection sweeps a range of angles that corresponds to the span covered going from one switching layer to the next on the "deflection element" with Pos. 1 (take notice of the angle $\phi_0$. It is obvious that the tilting of the switching layers in the first (Pos. 1) deflection element A1 (Pos. 3) is bigger than tilting of the switching layers (Pos. 4) in the second deflection element A2 (Pos. 2).
Figure 4:
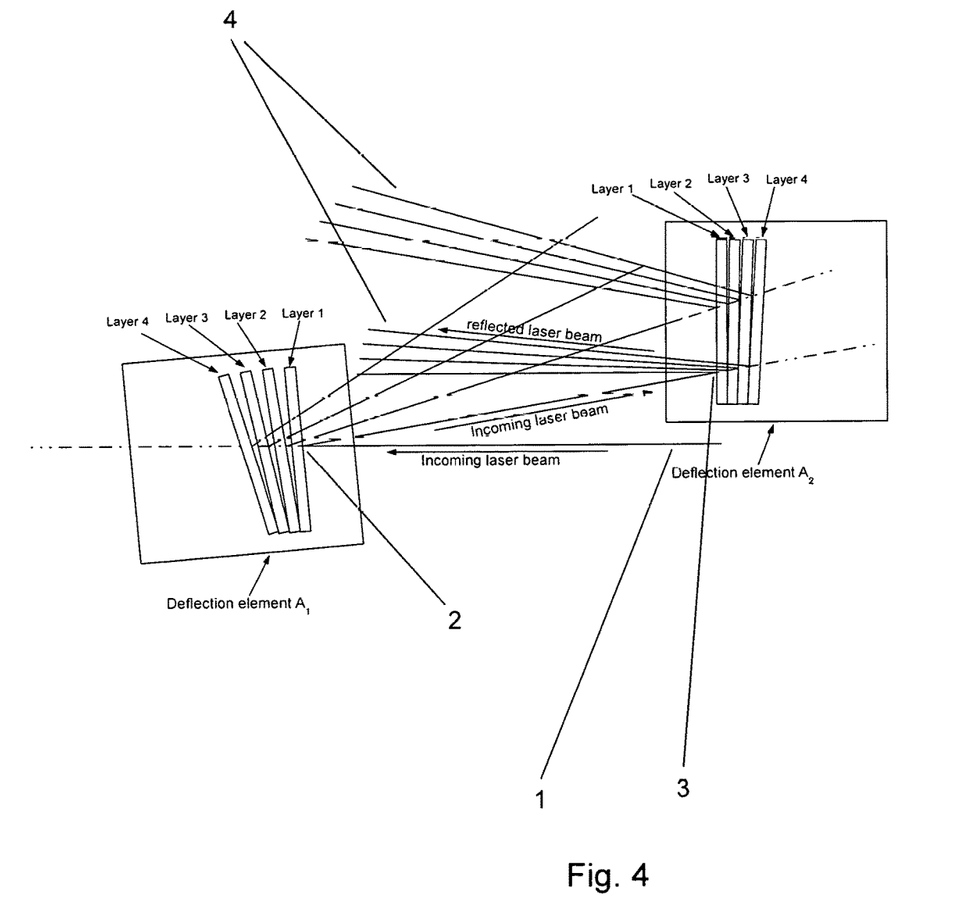
FIG. 4 depicts a possible spatial arrangement and sequence of the "deflection elements" (here A1 and A2) to deflect a laser beam in one, or by using two sequences of deflection elements in two directions. Pos, 1 shows an incoming laser beam, with a first reflection on Pos. 1 and a second reflection on Pos. 2. Pos, 4 shows the finer succession of deflection angles after passing through two deflection elements A1 and A2. An even finer sequence would be possible on similarly using 3 deflection elements—the span (or tilting) would be even smaller in the case of a third deflection element. Proper arrangement/distances of the deflection elements and dimensioning leads to an acceptable uniform overall deflection at Pos. 4, that in the case of the drawing shows a gap between two depicted reflected laser beam bunches, that of course has to be taken account of by proper optical/mechanical engineering. The aim is a uniform spacing of the deflected beams over the whole range of possible deflection.
Figure 5:
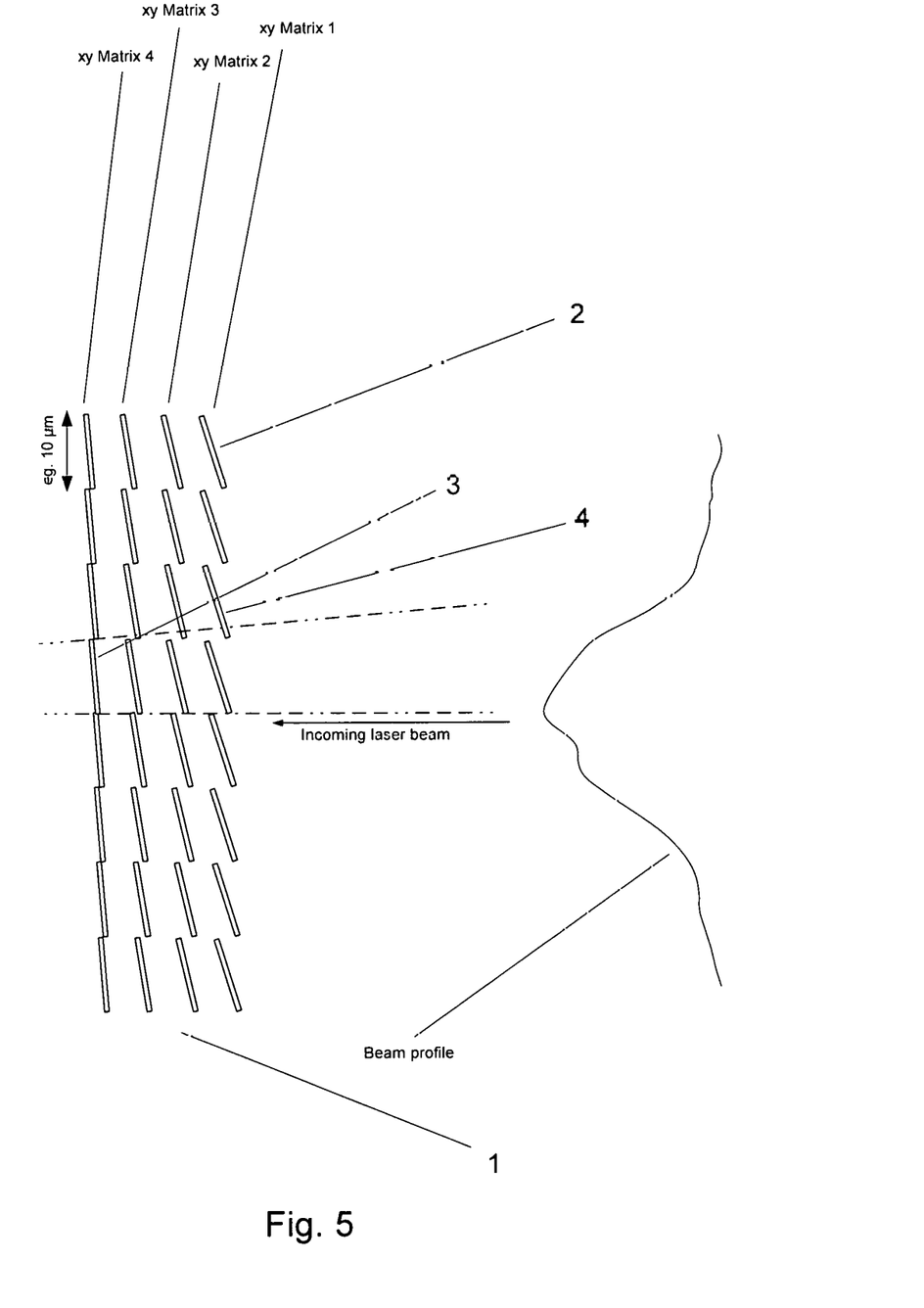
FIG. 5 depicts a possible cut of a spatial arrangement of a deflection distortion element that is based on a combination of deflection elements in a×y matrix, that deflect the beam on a "per pixel basis". Pos. 1 shows the complete "stack". The stack shows a setup that favors only one deflection direction (here deflection "up"). Setups with deflections "up" and "down" are similarly possible. Pos. 2 is an individual switching mirror element/"pixel" of size eg. 10 µm times 10 µm. The laser beam would be reflected in various depths/layers to correct possible deflection distortions on a "per pixel" basis. The xy matrices shall be close to each other to minimize masking situations for reflections from deeper layers on higher layers. Even individual pixels shall be further broken down to switcheable areas, that can be switched on and off according to possible maskings that might occur. Switching layers in deeper layers shall have smaller deflection tilts in relation to the incident laser beam. A possible masking configuration is depicted with the deeper layer on Pos. 3 and the higher adjacent layer on Pos. 4. A reflected beam would cut a substantial fraction of the higher adjacent pixel/layer on Pos. 4.
Figure 6:
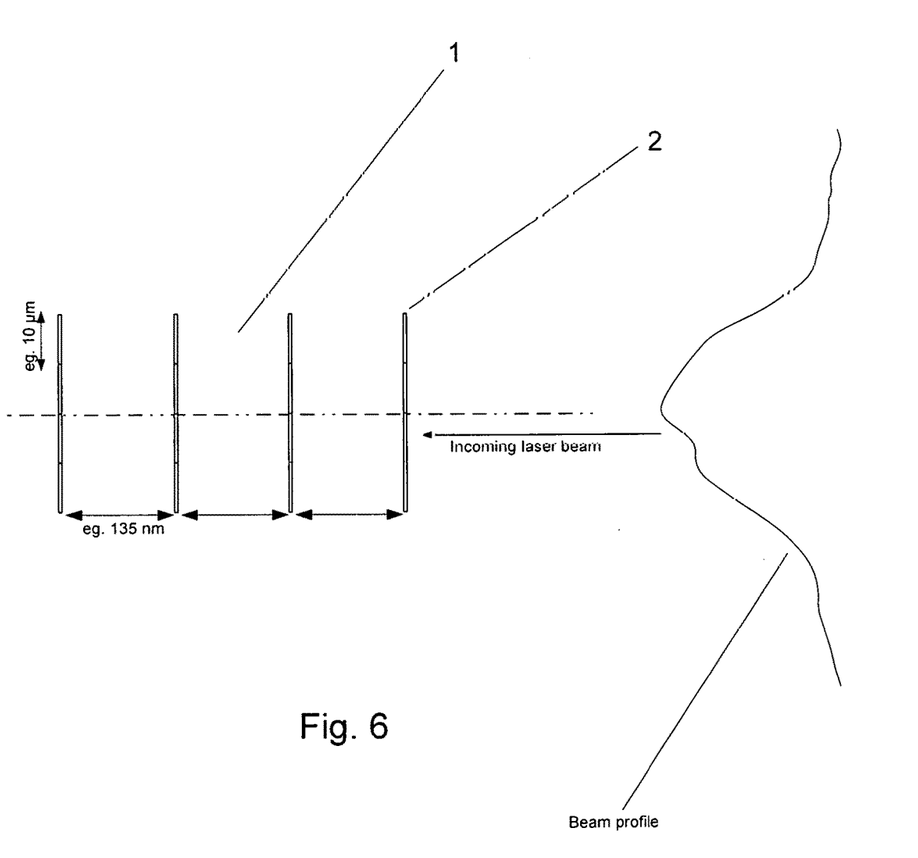
FIG. 6 depicts a possible cut of a spatial arrangement of a phase distortion correction element that is based on a combination of deflection elements in a×y matrix, that reflect the beam on a "per pixel basis". Pos. 1 shows the complete "stack". Pos. 2 shows an individual switching mirror element of size eg. 10 µm times 10 µm. The laser beam would be reflected in various depths to correct possible phase/optical path differences.

By using elements as depicted in FIG. 1 that either are made of single layer switching films or multiple layer dielectric switching films as shown on FIG. 2 it is possible to quickly change the optical properties of the switching films from transparent to reflective. A mechanism and a setup is found that makes it possible to deflect a laser beam to ever more refined deflection angles by leaving one deflection element and entering the next. The possible angular span, and granularity of the deflection is made possible due to the choice of a cascade of deflection elements, each of which includes a sequence of switching layers, that preserve a fixed tilt angle going from one to the next switching layer (FIG. 3,4). The selection of the switching layer, by switching it reflective and all the other layers transparent, makes it possible to deflect the laser beam into a wanted deflection direction. Special care has to be taken to warrant a proper interalignment of the deflected beams, that leave the following/next/subsequent "deflection element" in a setup. As clearly depicted in FIG. 4 the deflection element A2 has to be brought much closer to $A_1$ to put the reflected beam of Layer 2 of $A_1$ much closer to the reflections of the reflected beam of Layer 1 of $A_1$ on Layer 1 of $A_2$ to match the deflections of the reflection of Layer 1 of $A_1$ (on A2) with the deflections of the reflection of Layer 2 of $A_1$ (on A2). This is possible for certain—to be computed—distances of $A_1$ to $A_2$, certain maximum tilt angles, certain laser beam widths, certain layer thicknesses and distances. The wavefront distortion of the leaving laser beam is corrected with the same switching layer technology—whereby the layers now are xy matrices of eg. μm huge pixels. These pixels might be tilted switching layers, that might even be switched on and off only partially to prevent masking effects (FIG. 5). All this lies in the realm of state of the art MEWS technology even for the required accuracy of tilt angles, although it has to be taken into account that planarity of the used layers/pixels has to be maintained while a means has to be used that delivers accurately tilted layers/pixels in a xy matrix. There is some flexibility in the choice of the size of the pixels, as much as in the choice of the possible range and number of distinct deflection angles for the deflection angle distortion correction, to make the production of these matrices tractable. Mismatches in phase can similarity be corrected with a stack of xy matrices of switching layers (FIG. 6).

REFERENCES

Stefanovich et al., Electrical switching and Mott transition in $VO_2$, *J. Phys.: Condens. Matter* 12 8837

Myoung-Jae Lee et al., A plasma-treated chalcogenide switch device for stackable scalable 3D nanoscale memory, *Nature Communications* volume 4, Article number: 2629

The invention claimed is:
1. A laser scanning/deflection system comprising:
a first sequence of first, second and third deflection elements, each of which carries a sequence of optically switching layers along a path of incidence,
wherein the optical switching layers are tilted towards each other with a fixed tilt angle between normals to consecutive optically switching layers,
wherein all the normals lie in a plane with sum of the fixed tilt angles "θspan" over the sequence of optically switching layers of each of the deflection elements,
Wherein a sum or span varies for each of the first sequence of deflection elements;
wherein, preferably the first sum or span θx1=θspanx for the first deflection element, the second sum or span θx2=θspanx/n (n being the number of switching layers in the first deflection element that equals the tilt between two consecutive switching layers of the first deflection element) for the second deflection element, and the third sum or span θx3=θspanx/(n*j) (j being the number of switching layers in the second deflection element, that equals the tilt between any two consecutive switching layers of the second deflection element) for the third deflection element;
wherein the sequence of deflection elements are used to deflect an incident laser beam in a first deflection direction x and the number of possible discrete deflection angles is N=n*j*k, (k being the number of switching layers in the third deflection element);
a second sequence of deflection elements with varying sum of tilt angles θy1,2,3 for the second sequence of deflection elements, having same setup and sequence as the first sequence of deflection elements, with a corresponding θspany; wherein the second sequence of deflection elements is used for deflecting an incident laser beam to a second deflection direction y orthogonal to the first deflection direction x;
wherein a laser beam traverses the first and second deflection directions by leaving the first deflection element and entering the second deflection element, subsequently leaving the second deflection element and entering the third deflection element and thereby being deflected with progressively finer further deflections stemming from switching layers that have progressively smaller tilt angles towards each other from the first to the third deflection elements, wherein the laser beam is subsequently deflected in the second deflection direction y by the second sequence of deflection elements in the same manner;
wherein the first and second sequences of deflection elements deflect the laser beam to a discrete set of possible output beams that are equidistantly tilted towards each other;
wherein the sum of the three fixed tilt angles (θx1+θx2+θx3) is closest to a wanted tilt angle for the first deflection direction x of the first sequence of deflection elements, the sum of the three fixed tilt angles (θy1+θy2+θy3) is closest to a wanted tilt angle for the second deflection direction y of the second sequence of deflection elements and the deflection direction in x and the deflection direction in y is the cumulative sum of subsequent, progressively finer further deflections in the passage through the first and second sequences of deflection elements;
wherein the sequences of optically switching layers of the first and second sequences of deflection elements are rapidly switched on or off by electricity to rapidly change between a totally transparent mode and a totally reflective mode;
wherein switching of layers is achieved by switching all layers transparent up to and except the one that deflects the laser beam to the wanted tilt angle or the deflected direction; and
wherein each of the first "or x" and second "or y" sequences of deflection elements includes a blocking (switchable) absorber layer in front of the sequence of optically switching layers in the totally reflective mode.

2. The laser scanning system according to claim 1, wherein the sequences of optically switching layers are subject to a laser beam that targets individual switching films exposing them to heat transfer to perform switching.

3. The laser scanning system according to claim 1, wherein the sequences of optically switching layers are made of metallic optical switches.

4. The laser scanning system according to claim 1, wherein the sequences of optically switching layers are made of a reflective dielectric chalcogenide optical switch that employs switching of one of the dielectric materials A or B in an alternating ABABABAB dielectric layer setup.

5. The laser scanning system according to claim 1, wherein the sequences of optically switching layers include phase changes in a fluid medium that rapidly build up a highly reflective membrane on being electrically switched with selectable electrode lines; said highly reflective membrane having a tilt angle that depends on firing up a specific electrode out of a number of electrodes in the phase change fluid medium.

6. The laser scanning system according to claim 1, wherein the blocking (switchable) absorber or deflection layer absorbs or deflects the laser beam to a light or heat sink, to bridge the time gap between consecutive switching of the switching layers in the sequences of deflection elements.

7. The laser scanning system according to claim 1 further comprising: a last deflection element that is traversed after the laser beam has passed the first and second sequences of deflection elements for the x direction and for the y direction, to add optical depth to the traversed optical depth of the deflected laser beams, so that on leaving the scanner system, all deflected laser beams would have the same intensity; wherein the last deflection element is made of a last sequence of switching layers that are not tilted towards each other.

8. An adaptive optics element, comprising:
a number of three stacked combinations of m switching film layers, that are traversed by an incident laser beam, one after the other, the three stacked combinations having various overall lengths,
wherein in each of the three stacked combinations of m switching film layers each layer is divided into an orthogonal grid of quadratic sections addressing a position on a matrix that extends and contains the whole of an incident laser beam profile, and m−1 transparent spacer layers of various thickness in between the switching film layers, the m−1 transparent layers being empty volumes of air;
wherein said the three stacked combinations of m switching film layers and m−1 transparent layers covers various overall lengths, therefore a first adaptive optics element covers the dozens of micrometer range (or even more for a four stacks cascade setup), a second adaptive optics element with smaller transparent spacers covers the range up to 3 micrometers,
wherein the three stacked combinations of m switching film layers, that only differ in their overall length, are traversed one after the other, to adjust the phase of the incident laser beam wavefront;
wherein each of the m switching film layers reflects the incident laser beam on electrically switched quadrants, adding a discrete path length (defined by the position number of the switching layer in the adaptive optics stacks and the overall length of the stack) to the part of the beam, that is incident to the electrically switched quadrants;
wherein the choice of one of the m switching layer matrices that fires off at a grid position, that switches the quadrant to a reflecting state at that position implies all other switching layer matrices of the stack at this position being switched to transparent;
wherein the incident beam obtains a proper optical path/phase as a function of the position on the plane of incidence to customize the phase of the wave front of the incident laser beam;
wherein phase correction of said switching layers as a function of the two dimensional coordinates of the incident laser beam profile adds up to a total amount of correction by passing through the sequence of phase correction stacks, sequentially entering the stacks with higher and subsequently entering the ones with ever smaller overall length or smaller phase correction ability;
wherein phase correction adds up to the necessary amount of phase correction with fine enough discrete phase correction steps of about 15 nm simultaneously covering a huge enough span of optical depth differences of up to 100 microns;
wherein the phase distortion, that stems out of the passage of the multitude of transparent layers of the scanning process of the incident laser beam, is minimized;
wherein the three stacked combinations of m switching film layers include electrodes for every grid point, which are made of highly transparent metallic material minimizing the distortion of the incident beam.

9. A method for the laser scanning system according to claim 8, comprising scanning through all directions of possible beam deflections to measure the intensity of the leaving incident laser beam that traversed the x "deflection elements" and subsequently the y "deflection elements" to hereby precompute correction values/settings for the optical depth correction system for all the combinations of x deflections and y deflections;
feeding said correction values/settings into the system that corrects optical depth—for use in the normal operation of the scanner system with GHz refresh frequency—to tailor the intensity of the deflected laser beam that leaves the scanner;
wherein said feeding of correction values/settings, computed from the measured intensities, happens synchronously with setting the xy values for the deflection of the incident beam.

10. A method for the adaptive optics system according to claim 8, comprising scanning through all x and y directions of possible scanner deflections of the incident beam to measure the wave front phase distortion—the matrix resolved wave front differences in traversed optical path—of the leaving beam to precompute correction values/settings for the phase correction system);
feeding said correction values/settings into the wave front phase correction—to tailor the path length of the leaving beam wavefront on a "per pixel" basis;
wherein said feeding of correction values/settings happens synchronously to setting the xy values for the scanner deflection of the incident beam.

11. A stacked optics element according to claim 8 with k switching layers of quadrants that are arranged as an orthogonal grid, that are switched on without electrodes by employing a laser beam that targets individual "pixels" on the switching layer—as a nonelectronic alternative to switching the optical properties of the switching layers.

12. The stacked optics element according to claim 8, wherein each of the m switching film layers is divided into an xy matrix of deflection elements, wherein each of the xy matrix of deflection elements is tilted with respect to the axis of the incoming laser beam, and wherein the incoming laser beam is deflected on a "per pixel" basis where each pixel corresponds to a deflection element within the xy matrix.

13. A method for the adaptive optics system according to claim 12, comprising scanning through all x and y directions of possible scanner deflections of the incident beam to measure the wave front phase distortion—the matrix resolved wave front differences in traversed optical path—of the leaving beam to precompute correction values/settings for the phase correction system);
feeding said correction values/settings into the wave front phase correction—to tailor the path length of the leaving beam wavefront on the "per pixel" basis;

wherein said feeding of correction values/settings happens synchronously to setting the xy values for the scanner deflection of the incident beam.

14. A stacked optics element according to claim 12 with k switching layers of quadrants that are arranged as an orthogonal grid, that are switched on without electrodes by employing a laser beam that targets individual "pixels" on the switching layer—as a nonelectronic alternative to switching the optical properties of the switching layers.

* * * * *